US012626685B2

(12) United States Patent  
Palermo et al.

(10) Patent No.: US 12,626,685 B2  
(45) Date of Patent: May 12, 2026

(54) ELECTRIC ROAD VEHICLE PROVIDED WITH A REPRODUCTION DEVICE FOR THE REALIZATION OF A SOUND ASSOCIABLE WITH A GEAR SHIFT AND RELATED METHOD

(71) Applicant: FERRARI S.P.A., Modena (IT)

(72) Inventors: Antonio Palermo, Modena (IT); Maddalena Cirillo, Modena (IT); Roberto Betro', Modena (IT); Ugo Sitta, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/830,911

(22) Filed: Sep. 11, 2024

(65) Prior Publication Data

US 2025/0087201 A1     Mar. 13, 2025

(30) Foreign Application Priority Data

Sep. 11, 2023    (IT) ........................ 102023000018567

(51) Int. Cl.  
*G10K 15/02*          (2006.01)  
*B60L 15/20*          (2006.01)

(52) U.S. Cl.  
CPC .............. *G10K 15/02* (2013.01); *B60L 15/20* (2013.01); *B60L 2240/486* (2013.01); *B60L 2250/26* (2013.01)

(58) Field of Classification Search  
CPC ... G10K 15/02; B60L 15/20; B60L 2240/486; B60L 2250/26; F16H 2059/0247; B60Q 5/008; B60Q 9/00; B60W 50/16  
See application file for complete search history.

(56) References Cited

U.S. PATENT DOCUMENTS 5,635,903 A      6/1997  Koike et al.  
8,212,505 B2 *   7/2012  Nagashima ........... B60L 15/025  
                                                              180/65.21

(Continued)

FOREIGN PATENT DOCUMENTS

CN         114670750 A  *  6/2022  ............... B60L 5/20  
DE     102020125551 A1     4/2021

(Continued)

OTHER PUBLICATIONS

Italian Search Report dated Feb. 27, 2024 for Italian Application No. 102023000018567 filed Sep. 11, 2023, 6 pages.

*Primary Examiner* — Tisha D Lewis  
(74) *Attorney, Agent, or Firm* — CANTOR COLBURN LLP

(57)          ABSTRACT

A road vehicle includes four wheels, of which at least two are drive wheels; a passenger compartment configured to accommodate at least one driver; at least one electric motor configured to deliver drive torque to the at least two drive wheels; a gear shift system, which is configured to allow the driver to select one of a plurality of virtual gears and to switch from one virtual gear to another while driving; an acoustic system, which comprises at least one reproduction device configured to generate a sound associable with a switch from one virtual gear to another; and a control unit configured to detect a gear shift request from the driver to the gear shift system and control the acoustic system to reproduce the sound.

15 Claims, 5 Drawing Sheets

(56) References Cited

U.S. PATENT DOCUMENTS

| | | | |
|---|---|---|---|
| 2022/0194410 A1 | 6/2022 | Kim et al. | |
| 2023/0001853 A1* | 1/2023 | Betro' | ................... B60Q 5/008 |
| 2023/0249703 A1 | 8/2023 | Oh et al. | |

FOREIGN PATENT DOCUMENTS

| | | | | |
|---|---|---|---|---|
| JP | 2021061462 A | 4/2021 | | |
| WO | WO-2011050274 A1 * | 4/2011 | ............ | G10K 15/04 |
| WO | 2023086310 A1 | 5/2023 | | |

* cited by examiner

ELECTRIC ROAD VEHICLE PROVIDED WITH A REPRODUCTION DEVICE FOR THE REALIZATION OF A SOUND ASSOCIABLE WITH A GEAR SHIFT AND RELATED METHOD

CROSS-REFERENCE TO RELATED APPLICATIONS

This patent application claims priority from Italian patent application no. 102023000018567 filed on Sep. 11, 2023, the entire disclosure of which is incorporated herein by reference.

FIELD OF THE ART

The present invention relates to a road vehicle provided with a reproduction device for the realization of a sound associable with an electric motor and a related method.

In particular, the present invention finds advantageous, but not exclusive application in the control of a high-performance road vehicle, configured to perform track laps, to which the following description will make explicit reference without thereby losing in generality.

PRIOR ART

Historically, in the technological evolution with the motor vehicle as the protagonist, it became necessary to introduce a gear (or speed) shifting system to overcome the mechanical limits imposed by the internal combustion (endothermic) engine, which, in the absence of the gear shifting system, could not cover an adequate speed range.

In particular, therefore, a gear shifting device is used which allows the transmission ratio to be varied to generally allow the multiplication of the torque delivered by the endothermic engine and to adapt the rotation speed of the latter to that of the wheels (so that high power can be available even at rather low forward speeds and high speeds can be reached).

This device in the vast majority of the cars is still the mechanically operated gearbox, which allows the pilot to be able to choose depending on the conditions of use of the vehicle between different ratios, i.e. between different gears (the number of gears varies based on the model of the vehicle).

Over the decades, starting from the need for the presence of a gear shifting system dictated by the limits of the endothermic engine, the opportunity arose to create numerous types of gear shifting systems, in particular increasingly high-performance ones (e.g. the well-known dual-clutch gearbox). In this way, the gear shifting system has become a distinguishing feature among motor vehicle manufacturers and, as previously mentioned, a tool for involving the pilot while driving the road vehicle.

In recent times, with the spread of the electric power train systems, we are moving away from the endothermic engine and at least one electric motor is thus being introduced, which solves the need for a gear shift as it is perfectly capable of quickly providing the necessary torque and of going from zero speed to maximum speed without any transmission problem.

Although the electric power train systems tendentially allow to improve performance, as they are always able to take advantage of the maximum acceleration available for a given speed, the pilot's involvement in making certain choices is reduced, such as which gear to use when entering a curve, or the feeling of detachment given by the torque pick-up when upshifting during acceleration or downshifting during deceleration, thereby reducing driving pleasure, especially in the case of high-performance sports vehicles.

As is known, therefore, during its operation, the electric motor emits very slight sounds mostly associated with vibration of the mechanical components of the electric motor.

This introduces a problem of awareness of the driver with respect to the operating conditions of the electric motor and more generally with respect to the performance of the motor vehicle comprising the electric motor.

In practice, from the driver's point of view, the performance of the above-mentioned motor vehicles is not satisfactorily emphasized.

Therefore, the need is felt to emphasize more the performance of the motor vehicles or to increase the awareness of the driver with regard to such performance.

In addition, some drivers are notoriously interested in perceiving sounds associated with the operation of the motor vehicle for reasons of driving pleasure.

Consequently, in high-performance sports cars the sound that is produced by an electric motor is not perceived within the passenger compartment or in any case it may be at least partially unsatisfactory.

Therefore, the need to increase the driver's driving pleasure is also felt.

The patent document US2023249703 describes a control method to generate a perception of virtual gear shift.

Aim of the present invention is to realize an electric road vehicle provided with a reproduction device for the realization of a sound associable with an electric motor and a related method, which are at least partially free from the drawbacks described above and, at the same time, are simple and inexpensive to realize.

SUMMARY

In accordance with the present invention, there are provided an electric road vehicle provided with a reproduction device for the realization of a sound associable with an electric motor and a related method as claimed in the following independent claims and, preferably, in any one of the claims directly or indirectly dependent on the independent claims.

The claims describe preferred embodiments of the present invention forming an integral part of the present disclosure.

BRIEF DESCRIPTION OF THE DRAWINGS

The present invention will now be described with reference to the enclosed drawings, showing some non-limiting embodiments thereof, wherein.

PREFERRED EMBODIMENTS OF THE INVENTION

With reference to the attached figures, 1 denotes as a whole a road vehicle in accordance with non-limiting embodiments of the present invention.

The same numbers and the same reference letters in the figures identify the same elements or components with the same function.

In the context of this disclosure, the term "second" component does not imply the presence of a "first" component. These terms are in fact used as labels to improve clarity and should not be understood in a limiting way.

The elements and features shown in the various preferred embodiments, including the drawings, may be combined with each other without thereby departing from the scope of protection of the present application as described below.

It should be noted that in the remainder of this description, expressions such as "above", "below", "front", "rear" and the like are used with reference to conditions of normal forward moving of the road vehicle 1 along the normal forward direction D.

In particular, the road vehicle 1 is provided with two front wheels 2 and two rear wheels 3 of which at least one pair are drive wheels, which receive the drive torque from an electric motor 4 arranged in a rear position, i.e. at a rear axle.

Figure 2:
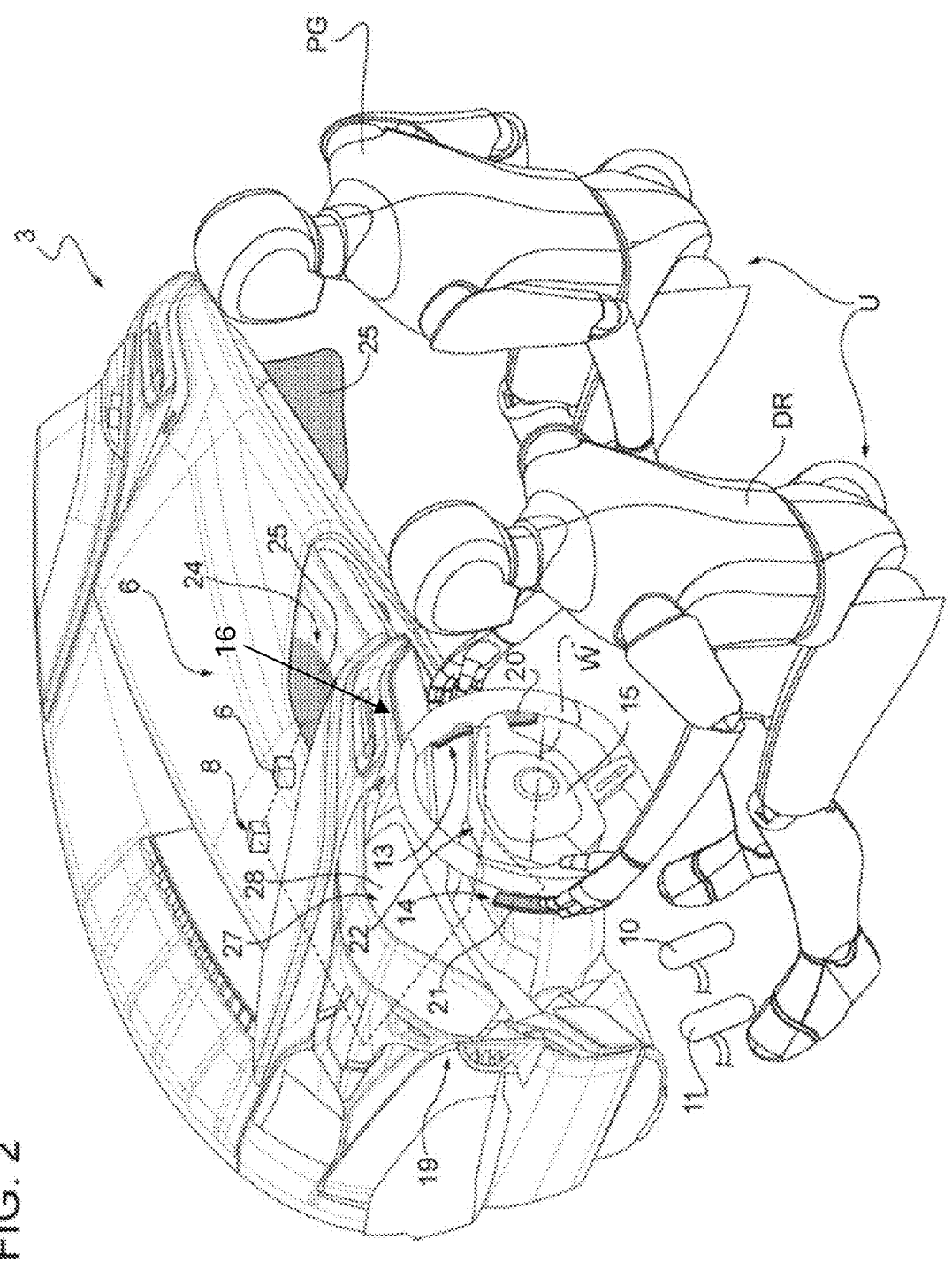
FIG. 2 is a perspective view, with details removed for the sake of clarity, of part of the interior of the road vehicle of FIG. 1.

The road vehicle 1 is provided with a passenger compartment 5 which is adapted to house one or more users U, such as the driver DR and one or more passengers PG as shown in FIG. 2.

In other non-limiting and not shown embodiments, the electric motor 4 is arranged at a front axle (i.e. the vehicle has front-wheel drive).

In further non-limiting and not shown embodiments, the electric motor 4 is arranged at both said axles (i.e. the vehicle has all-wheel-drive).

In particular, each single-axle drive can be defined by a single electric motor 4, optionally coupled to a differential, or by a pair 4 of electric motors.

In particular, in the case of an all-wheel drive, it may comprise two electric motors 4 (one front and one rear), three electric motors 4 or one electric motor 4 for each wheel 2 of the road vehicle 1.

Figure 1:
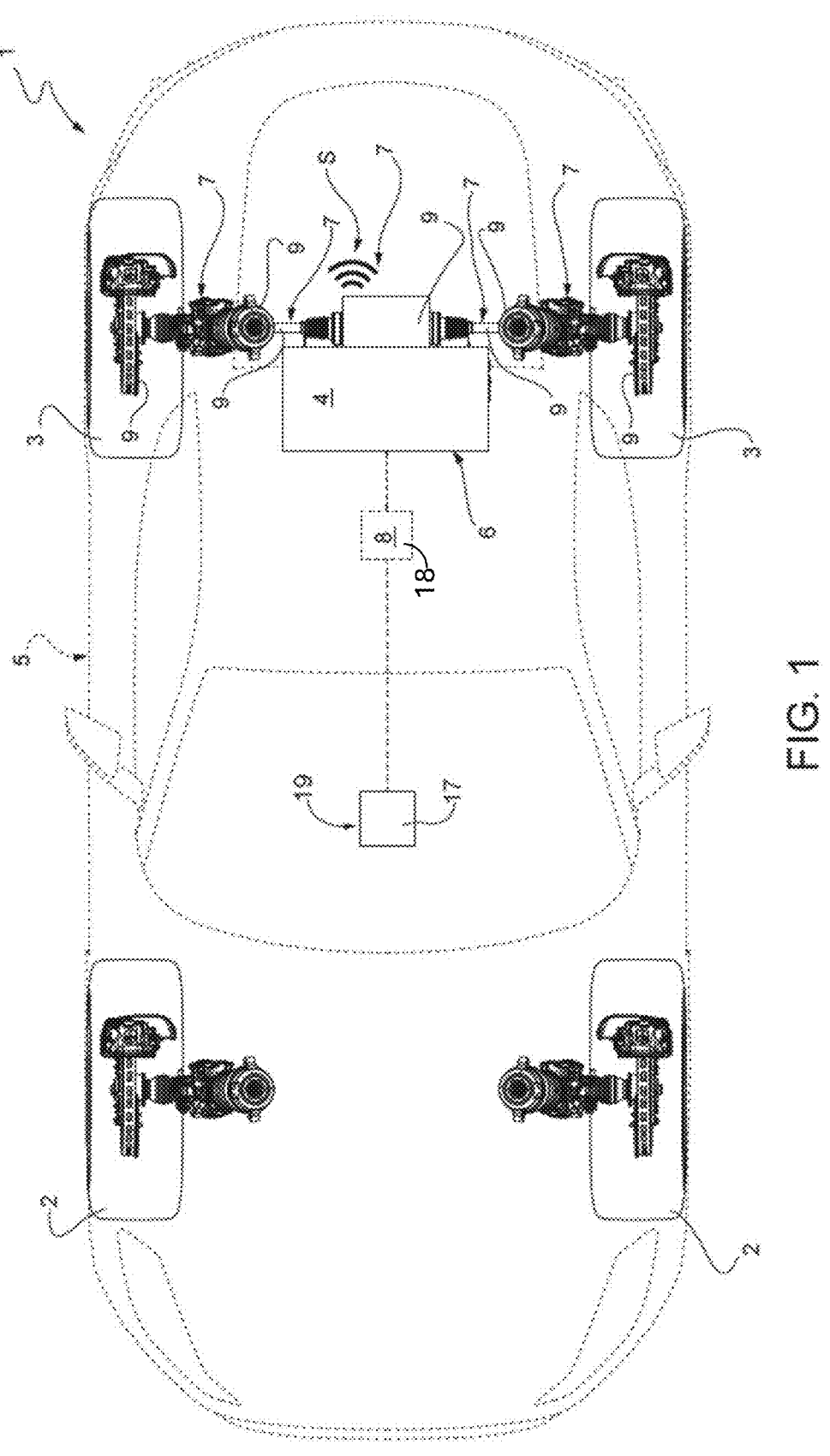
FIG. 1 is a perspective and schematic view of a road vehicle made in accordance with the present invention and provided with an electric power train system.

According to what is shown in FIG. 1, the car 1 comprises an acoustic system 6 that has the function of generating a sound by means of the electric motor 4, so that the sound is perceived, distinguishable and identifiable by the occupants of the passenger compartment 5 of the road vehicle 1. In particular, the sound generated by the acoustic system does not necessarily have to be "pleasant", but must be clearly perceptible so as to be useful while driving for understanding the conditions of the motor.

The vehicle 1 also comprises a vehicular dashboard 16, which is arranged in front of the driver DR and any passenger PG and is of a known type and therefore not further detailed below.

Advantageously, moreover, the vehicle 1 comprises a gear shifting system 19, which is configured to allow the driver DR to select a virtual gear among a plurality of virtual gears 18 and to shift from one virtual gear to another while driving. In particular, the gear shifting system 19 comprises an interface system 17 in accordance with what is described below.

In particular, the selection of the virtual gear by the driver DR influences (limits) the drive torque delivered by the electric motor 4 (in a known manner and therefore not further detailed).

According to some non-limiting embodiments, each of the virtual gears 18 determines a limit profile of drive torque deliverable by the electric motor 4 to the wheels 2, 3 as the velocity of the road vehicle 1 along the normal forward direction varies.

Preferably, the word "virtual gears", taking into account that the electric motor 4 does not require a mechanical gearbox, as in the case of conventional internal combustion engines, means the imposition of an upper limit on the longitudinal acceleration (positive or negative) and, consequently, on the tractive power (i.e. torque) delivered to the wheels 2, 3 of the road vehicle 1.

What is described in this document is in particular to be considered valid both in a thrust, i.e. acceleration, configuration, in which the only pedal operated by the driver DR is an accelerator pedal 10, and in release (where no pedal is operated) or braking configurations, in which a brake pedal 11 usually present alongside the pedal 10 is used, as shown in FIG. 2.

In other words, what has been described remains valid for both virtual up-shift and virtual down-shift increments.

Advantageously but not necessarily, as shown in the non-limiting embodiment of FIG. 2, the interface system 17 comprises at least one first drive device 13 operable by the driver with the right hand and at least a second drive device 14 operable by the driver with the left hand.

According to some non-limiting embodiments, one of the first drive device 13 and the second drive device 14 is configured to allow the driver DR to shift to the higher virtual gear 18 (up-shift) and the other of first drive device 13 and second drive device 14 is configured to allow the driver DR to shift to the lower virtual gear 18 (down-shift).

Advantageously but not necessarily, the vehicle 1 comprises a steering wheel 15, which is rotatable about a central steering axis W.

Preferably but not in a limiting manner, the first drive device 13 and the second drive device 14 are arranged respectively to the right and to the left of the central steering axis W, in particular symmetrically, in particular so as to face each other and extend radially from said central steering axis W.

In some non-limiting cases, the drive device 13 is a right paddle 20 (or right lever) and the drive device 14 is a left paddle 21 (or left lever) of a gear shift control assembly 22 of a known type and not further detailed below.

In other non-limiting and not shown cases, the drive device 13 and the drive device 14 are buttons, levers or handles.

In further non-limiting and not shown cases, the drive device 13 and the drive device 14 are different from each other and chosen from those previously indicated.

Advantageously but not necessarily, the road vehicle 1 is a high-performance sports vehicle, i.e. configured to perform laps on the track reaching speeds above 250 km/h, in particular 300 km/h.

The acoustic system 6 comprises at least one reproduction device 7, which is configured to generate a sound S associable with a gear shift and to spread the sound itself towards the passenger compartment 5 and/or towards the outside of the vehicle 1.

The word "associable with a gear shift" means that the sound S is reproduced immediately after the driver DR has operated one of the devices 13 or 14, i.e. as soon as the driver DR shifts virtual gear (i.e. requests to shift virtual gear 18).

According to some non-limiting embodiments, the acoustic system 6 comprises a stereo system 24, which in turn comprises a plurality of speakers 25 installed within the passenger compartment 5 (see for example FIG. 2). In detail, the stereo system 24 is of a known type and will not be further detailed below.

According to some non-limiting and not shown embodiments, the acoustic system 6 is configured to reproduce the sound S so that it is also audible from outside the passenger compartment 5, in particular near/in the vicinity of the road vehicle 1. In this case, the system 6 may provide speakers (or resonant elements, as described below) external to the passenger compartment 5, for example at a platform or exhaust pipe.

Figure 3:
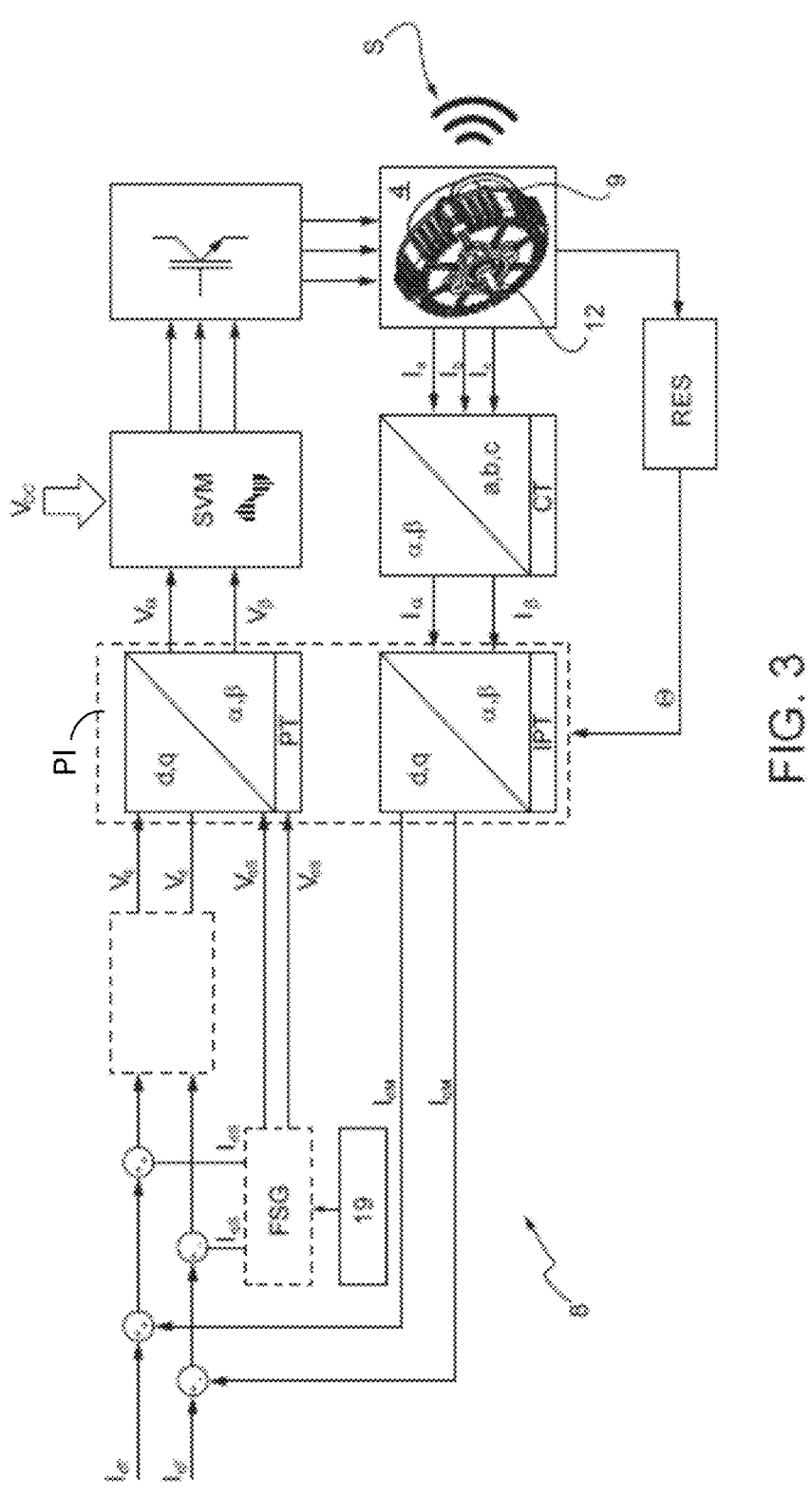
FIG. 3 is a possible embodiment of a control diagram of an electric motor of the vehicle of FIG. 1.

Advantageously but not in a limiting manner, as shown in the non-limiting embodiment of FIGS. 1 and 3, the acoustic system 6 comprises the electric motor 4, which is mechanically connected to the reproduction device 7 so as to be able to excite a resonant frequency thereof.

In particular, the reproduction device 7 is a resonant mechanical element, which, being mechanically connected to the electric motor 4, can be vibrated by the latter so as to generate the sound S. In other words, the reproduction device 7 is not an electric or electronic device, i.e. powered by electric energy.

In addition, the acoustic system 6 comprises an electronic control unit 8 ("ECU"—schematically shown in FIGS. 1, 2 and 3), which is configured to detect, while driving, a gear shift request of the virtual gear 18 provided by the driver DR to the interface system 17 of the gear shifting system 19.

The control unit 8 is further preferably configured to control the electric motor 4 so as to inject at least one acoustical current IqS, IdS (direct and in quadrature) or voltage VqS, VdS (hereinafter also only referred to as acoustical signal, for the sake of brevity) as an input of the electric motor 4 itself (see for example FIG. 2).

Advantageously, the control unit 8 is configured to inject the acoustical signal as soon as it detects a gear shift request from the driver DR (via the interface system 17).

In particular, the acoustical signal (i.e. the acoustical current IqS, IdS) excites a frequency which causes a vibration of the reproduction device 7, which emits, due to the vibration, in the form of acoustic waves, a sound S depending on the injected acoustical current IqS, IdS or voltage VqS, VdS.

The characteristics indicated below in relation to the acoustical current IqS, IdS are to be considered valid also in relation to the acoustical voltage VqS, VdS.

According to an example, the electric motor 4 is configured to emit or generate a variable or more precisely rotating magnetic field during its operation.

During operation, the electric motor 4 is supplied with a supply current, which provides the electric motor 4 with the electric energy to deliver a torque or a power.

Specifically, the electric motor 4 is a motor powered with alternating current, more specifically a synchronous motor or a permanent magnet motor. In other words, the supply current is an alternating current. The latter aspects are not essential, since the electric motor 4 could also be an asynchronous motor or an induction motor, or more generally any motor emitting a rotating or variable magnetic field during its operation.

The reproduction device 7 is preferably determined/constituted by a vibrating (resonant) mechanical element 9, preferably already present on board the road vehicle 1. More particularly, the mechanical element 9 is any element of an electric transmission comprising the electric motor 4, i.e. mechanically connected to the stator of the electric motor 4 or the stator itself.

For example, the mechanical element 9 is an axle (i.e. a rod), a differential, a panel, a wheel rim, a cover, a support, an axle pad, a fixing bar, etcetera. This avoids the need to install additional components.

Advantageously but not necessarily, the resonant element 9 is a metal element.

In some non-limiting cases, the resonant element 9 is a element made of plastic or composite material.

In the non-limiting embodiments of the figures shown, the electric motor 4 is configured to rotate the rear drive wheels 3. In other non-limiting cases, the vehicle 1 comprises two electric motors 4, one for each drive wheel.

In other non-limiting embodiments, the engine 4 is an additional engine to that necessary for the movement of the road vehicle 1.

Advantageously but not necessarily, therefore, the control unit 8 injects, simultaneously with the acoustical current IqS, IdS, a movement current IqT, IdT (i.e. the reference currents shown in the diagram of FIG. 3), which determines the rotation of a rotor 12 of the electric motor 4 and thus of the drive wheels 3 connected thereto, thus controlling the movement of the vehicle 1.

Alternatively, the control unit 8 injects, simultaneously with the acoustical voltage VqS, VdS, a movement voltage VqT, VdT (i.e. the reference voltages shown downstream of a controller PI, for example proportional-integrative, in the diagram of FIG. 3), which determines the rotation of the rotor 12 of the electric motor 4 and thus of the drive wheels 3 connected thereto, thus controlling the movement of the vehicle 1.

Advantageously but not in a limiting manner, acoustical current IqS, IdS has a frequency such that it does not engage with a magnetic flux of the electric motor 4, thereby avoiding generating movements of the rotor 10 and thus of the drive wheels 3. In this way, the injection of the current IqS, IdS harmonics that provide sound contribution is independent of the speed of the motor 4.

In other words, the control unit 8 is able to control the electric motor 4 so as to emit the sound S even with the motor 4 stopped or with the rotor 10 at constant speed. In these cases, therefore, the injection of the acoustical current IqS, IdS added (superimposed) to the movement current IqT, IdT only allows to "play" the mechanical element 9 (making it vibrate) without determining movements or errors in the locomotion of the road vehicle 1.

Figure 4:
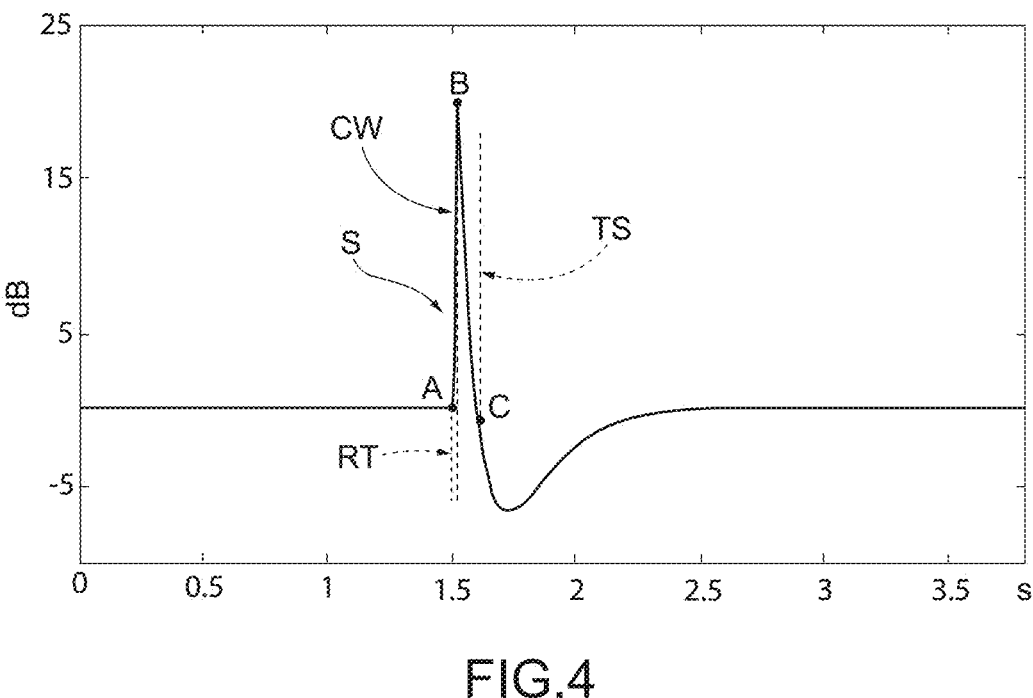
FIG. 4 and FIG. 5 are graphs for modelling impulsive sounds.
Figure 5:
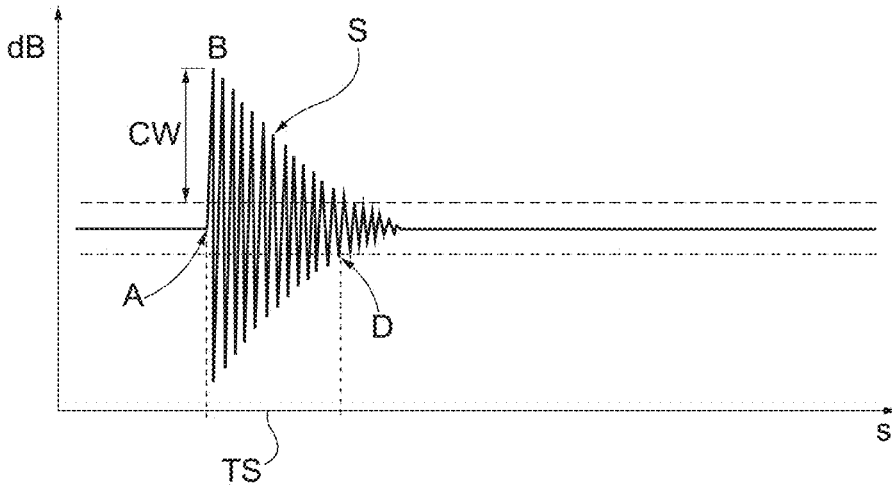
Figure 6:
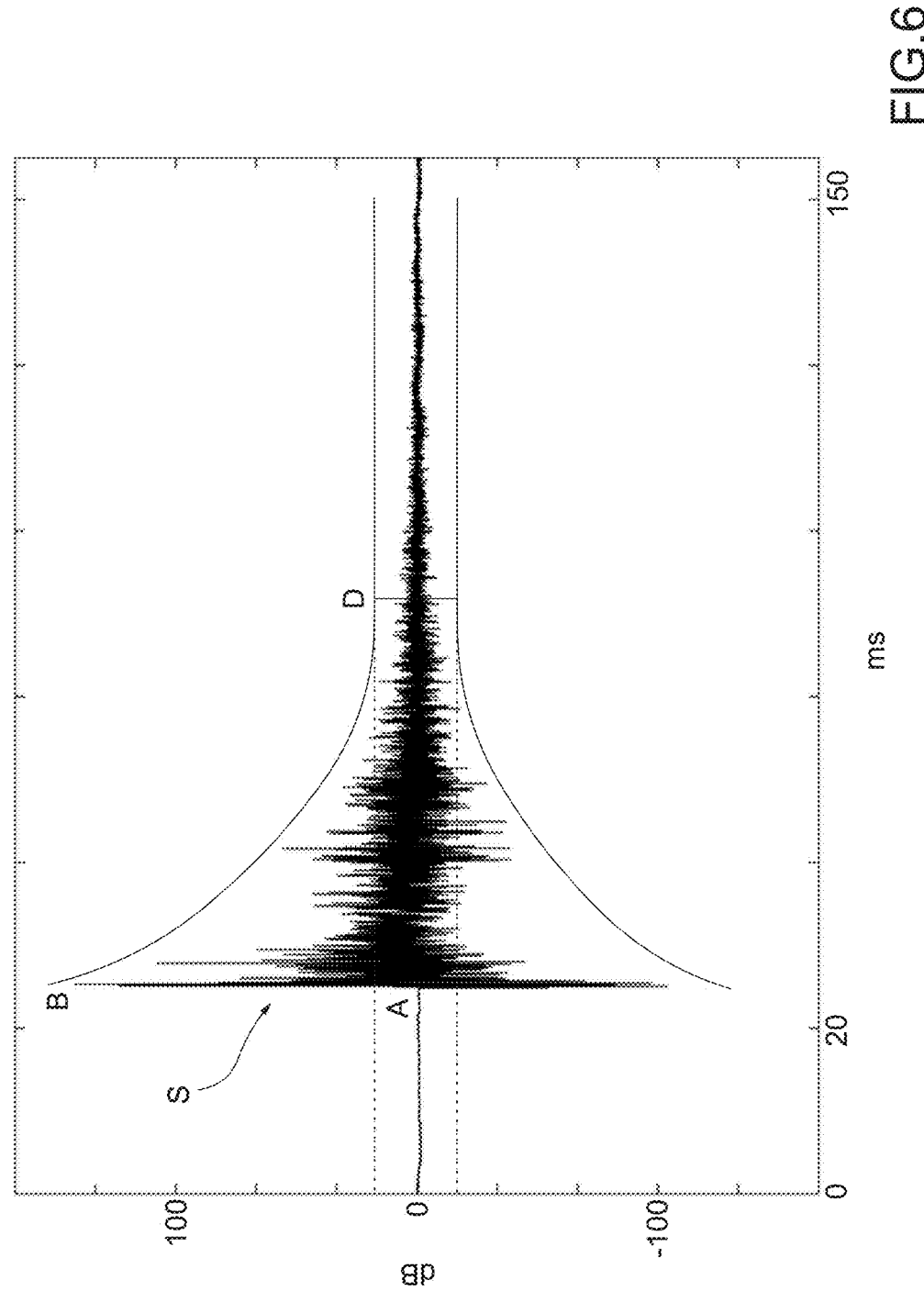
FIG. 6 is a graph showing an experimental example of impulsive sound according to a non-limiting embodiment of the present invention.

According to some non-limiting embodiments, as shown in FIGS. 4 to 6, the sound S generated by the acoustical signal is an impulsive sound.

The word "impulsive sound" means a sound S that involves one or more bursts of sound energy, each lasting less than one second. In particular, it refers to a sound S having a compressed sound wave in a time interval of less than one second and having a peak in amplitude equal to or greater than 20 dB.

Examples of sound waves of sounds S generating impulsive sounds are shown in FIGS. 4 and 5. In particular, these waves are normally classified as type A (FIG. 4) and type B (FIG. 5) as a function of the temporal history of the instantaneous sound pressure (ISO 10843).

Type A, also known as explosive generated noise, characterizes the types of typically shot pulses, while type B, also known as impact generated noise, is the most frequent one in the industry (for example, the pulses of an industrial punching machine). The characteristics of these impulsive sounds S are given by the value of the peak pressure CW (given by the distance between points A and B), the rise time RT and the duration TS (i.e. the time elapsing from point A to point C for type A and from point A to point D for type B, where point D indicates that the amplitude has fallen below a predefined threshold). These sound types and the modelling of these waves are known (see for example the volume "Fundamentals Of Acoustics"—Prof. Colin H Hansen, and "Applications and Comparison of Continuous Wavelet Transforms on Analysis of A-wave Impulse Noise"—Jun QIN, Pengfei SUN).

Advantageously but not in a limiting manner, the sound S is determined by a damped acoustic wave (i.e. a type B impulse wave, as previously described).

Preferably but not in a limiting manner, the sound S (i.e. the sound wave generating the sound S) has a duration ranging from 10 ms to 200 ms, in particular from 20 ms to 150 ms (as in the empirical example shown in FIG. 6).

Preferably but not in a limiting manner, the sound S (i.e. the sound wave generating the sound S) has an amplitude ranging from 20 dB to 150 dB, in particular from 50 dB to 100 dB.

According to some preferred but non-limiting embodiments, the driver DR can adjust the amplitude AB and duration AD of the sound S by means of a further interface system 27, for example a vehicular screen 28 (central with respect to the dashboard 16 or in the instrument panel of the driver DR, for example controllable by means of controls at the steering wheel 15).

Advantageously but not necessarily, the acoustical current IqS, IdS comprises a plurality of (damped) waves of different order and/or amplitude and/or frequency. In this way it is possible to generate a polyphonic sound S determining the vibration of different resonant elements 9. In particular, by injecting acoustical currents IqS, IdS into a plurality of harmonics of different order, it is possible to excite the resonant frequencies of different elements 9, which, by vibrating, generate different sounds S (in particular notes). In this way it is therefore possible to generate chords, enriching the sound S. In other words, therefore, the control unit 8, through the electric motor 4, is able to excite different orders by superimposing different harmonics within the acoustical signals IqS, IdS, obtaining a polyphony.

Therefore, the vehicle 1 is able to generate, through the motor 4, multifrequency/multiamplitude signals that will excite different orders of harmonics at the same time.

According to some preferred non-limiting embodiments, the control unit 8 is configured to vary the acoustical current IqS, IdS according to vehicular conditions, for example road roughness and/or open or closed sunroof. In other words, the control unit 8 is configured to vary the order, amplitude or frequency of the harmonics of the acoustical current IqS, IdS by emitting a different sound as the vehicular conditions vary. For example, the sound S is played at a higher volume in the case of an open roof or strong road roughness, so as to be sure that the sound S can still be perceived by the driver, regardless of the background noise.

According to a possible embodiment, the control unit 8 is configured to vary the acoustical current IqS, IdS according to driving parameters, set by the driver. In other words, the driver DR selects the type of sound he or she wants to hear to indicate the gear shift.

In some non-limiting cases, the control unit 8 is configured to detect the driving style of a driver according to known techniques and therefore not further detailed in the following text; in particular, the control unit 8 is configured to vary the signal of acoustical current IqS, IdS according to the driving style of the driver DR. In particular, the more sporty the driver DR is driving, the shorter and more intense the sound S will be, the more relaxed the driving will be, the longer and more blunt the sound S will be.

In particular, according to the aforementioned driving parameters or vehicular conditions, it is possible to vary the acoustical signals to best adapt the sound reproduction associable with the electric motor 4 to t the driving situations themselves.

According to some preferred but non-limiting embodiments, the sound S, and therefore the acoustical signal varies as a function of the engaged gear. In particular, lower gears correspond to a sound S at lower frequencies, while higher gears correspond to a sound S at higher frequencies, therefore more high-pitched.

Advantageously but not necessarily, the acoustical current IqS, IdS is configured so as to excite the reproduction device 7 to generate a decreasing sound ramp. In particular, the sound ramp is adjusted according to the virtual gear that the driver wishes to engage; in particular, the sound S will be more intense and high-pitched as the gears increase, and vice versa.

In accordance with a second aspect of the present invention, a method is provided for the realization of the sound S associable with a gear shift (i.e. gear shifting) of the road vehicle 1.

The method comprises the steps of:

injecting the acoustical current IqS, IdS as an input of the electric motor; wherein the acoustical current IqS, IdS excites a frequency that causes a vibration of the mechanical element 9 (resonant at that frequency and already present on board the road vehicle); wherein the element 9 emits, due to the vibration, in the form of acoustic waves, the sound S depending on the injected acoustical current IqS, IdS.

Furthermore, preferably, the method provides for preliminarily defining (in a design step) those that are the proper resonance orders of the components of the electrical transmission system, so as to calculate accordingly the orders of the harmonics that in resonance can emit certain sounds exciting in vibration the aforementioned components. This step allows the mechanical element 9 to be varied according to the parametric or driving choices of the driver DR, as previously described.

In particular, the order of harmonics necessary to emit a certain sound S depends on the type of electric motor and the structure connected thereto (for example, the electric transmission system).

Advantageously but not necessarily, the method also proceeds with experimentally carrying out a "tuning" the acoustical current IqS, IdS in order to centre the resonance bands as a function of the electrical transmission system.

In particular, in summary, the control unit 8 is configured to control (for example by means of an inverter of known type) the electric motor 4 so as to apply voltages to the ends of the inverter that generate impulsive shapes in accordance with what has been previously described.

More particularly, they are superimposed on the preferably damped movement currents IqT, IdT of the impulsive waves, which will excite the structural resonances of the electrical transmission system or of the electric motor 4 itself. These waves are also modulated in amplitude and frequency to generate the sound S.

Preferably, the acoustical currents IqS, IdS are at a frequency such that they do not engage with the magnetic flux of the electric motor 4, therefore they are filtered by the same. In particular, these currents belong to a different order with respect to the movement currents IqT, IdT.

In the non-limiting embodiment of FIG. 3, a schematic diagram of the control scheme used to control the electric motor 4 so as to emit the sound S is shown.

In particular, as soon as the gear shifting system 19, therefore the control unit 8, detects a "paddle shift", that is the action of the driver DR on one of the drive devices 13 or 14, to the movement currents IqT, IdT (from a block FGS of sound generation) the acoustical currents IqS, IdS as an input of a proportional-integrative PI controller are added, which processes the total voltage signals Vd, Vq (direct and in quadrature) (or of only movement, in some embodiments). In any case, the acoustical voltage signals VdS, VqS are added to the movement signals and subsequently are sent to the electric motor 4 according to a scheme known per se and shown in part of FIG. 3, in which PT and IPT respectively indicate the Park transform and its Inverse, CT indicates the Clarke transform, RES indicates a resolver and therefore θ indicates the position of rotor. In particular, the block SVM indicates an example of modulation, in this case space vector modulation (i.e. the well-known PWM control algorithm of an electric motor), which receives in input a reference VDC for the modulated discretization of the signal in input. Finally, the feedback currents IdM, IqM indicate the measured stator currents.

FIG. 6 reports an illustrative example of the results obtained by the vehicle 1 or by the method in accordance with the present invention. In particular, FIG. 6 reports a sound sample of a sound S generated by injecting acoustical currents IqS, IdS with impulsive waveform of B type into the electric motor 4. As can be noted, the vehicle 1 is able to modulate the acoustical current IqS, IdS so as to produce sounds S with intensity even equal to or greater than 90 dB.

Although the above-described invention makes particular reference to a very precise embodiment, it shall not be deemed as limited to that embodiment, since all those variations, modifications or simplifications covered by the appended Claims, such as a different type of electric motorization, a different type of interface system 17, a different number of virtual gears, etc., fall within its scope.

The embodiments described herein can be combined with each other without departing from the scope of protection of the present invention.

The method and the vehicle 1 described above have numerous advantages.

Firstly, the acoustic system 6 allows a sound to be generated by means of the electric motor 4 by exciting the structural resonances with multiple and sinusoidal harmonics, which make the sound pleasant (and therefore appreciated by) to the occupants of the passenger compartment.

In addition, the acoustic system 6 is simple and inexpensive to realise, as its realization does not affect components already present on the car 1 requiring modification thereof (and therefore significantly increasing production costs for the overhaul of mechanical parts already produced), but simply involves an implementation from the point of view of the software and optionally, the addition of devices and units of modest overall dimensions and limited weight.

Finally, the acoustic system 6 makes it possible to provide reliable and immediate feedback to the driver of the road vehicle 1, who, despite driving a car provided with an electric motor and therefore noiseless, can understand the vehicular conditions, in this case the shift from one gear to another, using his or her own hearing.

A further advantage of the present invention lies in increasing the driving pleasure, precisely by virtue of the fact that it appears to be more customizable, as well as the sound S to indicate the shift from one gear to another.

Finally, the control method described above is simple and inexpensive to implement in a road vehicle 1, as it does not require the addition of any physical components and can be completely realised via software by exploiting the architectures already normally present on board the road vehicle 1.

It is important to note that the method described above does not involve a high computing capacity, nor an extensive amount of memory and therefore its implementation is possible in a known control unit without the need for updates or upgrades.

The invention claimed is:

1. A road vehicle (1) comprising:

four wheels (2, 3), of which at least two are drive wheels (3);

a passenger compartment (5) configured to accommodate at least one driver (DR);

at least one electric motor (4) configured to provide drive torque to the at least two drive wheels (3);

a gear shifting system (19) which is configured to allow the driver (DR) to select one among a plurality of virtual gears and to shift from one virtual gear to another while driving;

an acoustic system (6) comprising at least one reproducing device (7) configured to generate a sound(S) associable with a shift from one virtual gear to another; and a control unit configured to detect a gear shift request from the driver (DR) via the gear shift system (19) and control the acoustic system (6) to reproduce the sound (S);

wherein the acoustic system (6) itself comprises the electric motor (4), which is mechanically connected to the reproducing device (7) so as to be able to excite a resonant frequency thereof;

wherein the control unit (8) is further configured to control the electric motor (4) so as to inject at least one acoustical current ($I_{qS}$, $I_{dS}$) or voltage ($V_{qS}$, $V_{dS}$) as an input of the electric motor (4) itself;

wherein the at least one acoustical current ($I_{qS}$, $I_{dS}$) or voltage ($V_{qS}$, $V_{dS}$) excites a frequency which causes a vibration of the at least one reproduction device (7), which emits, due to the vibration, in the form of acoustic waves, a sound(S) as a function of the injected acoustical current ($I_{qS}$, $I_{dS}$) or voltage ($V_{qS}$, $V_{dS}$);

wherein the sound(S) associable with a shift from one virtual gear to another is an impulsive sound having a sound wave compressed in an interval (TS) of time of less than one second and having a peak (A) in amplitude equal to or greater than 20 dB.

2. The road vehicle (1) according to claim 1, wherein the reproduction device (7) is a resonant mechanical element (9) made of metal.

3. The road vehicle (1) according to claim 1, wherein the control unit (8) injects, simultaneously with the acoustical current (IqS, IdS) or voltage (VqS, VdS), a movement current (IqT, IdT), which determines the rotation of a rotor (10) of the electric motor (4) and thus of the one or two drive wheels (3) connected thereto.

4. The road vehicle (1) according to claim 3, wherein the acoustical current (IqS, IdS) or voltage (VqS, VdS) has a frequency such that it does not engage with a magnetic flux of the electric motor (4), thereby avoiding generating movements of the rotor (10).

5. The road vehicle (1) according to claim 1, wherein the acoustical current (IqS, IdS) or voltage (VqS, VdS) generates the sound(S) via a damped signal.

6. The road vehicle (1) according to claim 1, wherein the sound(S) has a duration from 10 ms to 200 ms.

7. The road vehicle (1) according to claim 1, wherein the sound(S) has an amplitude ranging from 20 dB to 150 dB.

8. The road vehicle (1) according to claim 1, wherein the acoustical current (IqS, IdS) or voltage (VqS, VdS) comprises a plurality of harmonics of different order and/or amplitude and/or frequency, so as to generate a polyphonic sound(S) by causing the vibration of a plurality of reproduction devices (7).

9. The road vehicle (1) according to claim 1, wherein the control unit (8) is configured to vary the acoustical current (IqS, IdS) or voltage (VqS, VdS) according to vehicular conditions comprising road roughness and/or open or closed roof.

10. The road vehicle (1) according to claim 1, wherein the control unit (8) is configured to vary the acoustical current (IqS, IdS) or voltage (VqS, VdS) as a function of driving parameters.

11. The road vehicle (1) according to claim 1, wherein the control unit (8) is configured to vary the acoustical current (IqS, IdS) or voltage (VqS, VdS) according to the driving style of the driver.

12. A method for realizing a sound associable with a gear shift in a road vehicle (1) comprising at least one electric motor (4) configured to deliver drive torque to at least two wheels (3) of the road vehicle (1); the road vehicle (1) comprising a gear shifting system (19), which allows a driver (DR) to select one among a plurality of virtual gears and to shift from one virtual gear to another while driving; the method comprising the steps of:

detecting a gear shift request provided by the driver (DR) to an interface device (17) of the gear shifting system (19); and reproducing, at least within a vehicular cockpit (5), a sound(S) associable with a shift from one virtual gear to another;

wherein the step of reproducing comprises injecting, following the detection of a gear shift request, an acoustical current (IqS, IdS) or voltage (VqS, VdS) as input of the electric motor (4); wherein the at least one acoustical current (IqS, IdS) or voltage (VqS, VdS) excites a frequency that causes a vibration of at least one resonant element (9) of the road vehicle (1);

wherein the resonant element (9) emits, due to the vibration, in the form of acoustic waves, the sound(S) associable with the shift from one virtual gear to another;

wherein the sound(S) associable with a shift from one virtual gear to another is an impulsive sound having a sound wave compressed in an interval (TS) of time of less than one second and having a peak (A) in amplitude equal to or greater than 20 dB.

13. The method according to claim 12 further comprising:

preliminarily defining proper orders of harmonics for the resonance of the components of an electrical transmission system; and experimentally carrying out a tuning of the acoustical current ($I_{qS}$, $I_{dS}$) or voltage ($V_{qS}$, $V_{dS}$) resonance bands as a function of the electrical transmission system.

14. The road vehicle (1) according to claim 9, wherein the function of driving parameters comprises a position of a button and/or a driving mode and/or a position or change of position of a pedal and/or selections by the driver (DR) via a further interface system (27).

15. A road vehicle (1) comprising:

four wheels (2, 3), of which at least two are drive wheels (3);

a passenger compartment (5) configured to accommodate at least one driver (DR);

at least one electric motor (4) configured to provide drive torque to the at least two drive wheels (3);

a gear shifting system (19) which is configured to allow the driver (DR) to select one among a plurality of virtual gears and to shift from one virtual gear to another while driving;

an acoustic system (6) comprising at least one reproducing device (7) configured to generate a sound(S) associable with a shift from one virtual gear to another; and a control unit configured to detect a gear shift request from the driver (DR) via the gear shift system (19) and control the acoustic system (6) to reproduce the sound (S);

wherein the acoustic system (6) itself comprises the electric motor (4), which is mechanically connected to the reproducing device (7) so as to be able to excite a resonant frequency thereof;

wherein the control unit (8) is further configured to control the electric motor (4) so as to inject at least one acoustical current ($I_{qS}$, $I_{dS}$) or voltage ($V_{qS}$, $V_{dS}$) as an input of the electric motor (4) itself;

wherein the at least one acoustical current ($I_{qS}$, $I_{dS}$) or voltage ($V_{qS}$, $V_{dS}$) excites a frequency which causes a vibration of the at least one reproduction device (7), which emits, due to the vibration, in the form of acoustic waves, a sound(S) as a function of the injected acoustical current ($I_{qS}$, $I_{dS}$) or voltage ($V_{qS}$, $V_{dS}$);

wherein the sound(S) has a duration from 10 ms to 200 ms.

* * * * *